United States Patent Office 3,111,425
Patented Nov. 19, 1963

3,111,425
COATING REGENERATED CELLULOSE FILM WITH A SALT OF A SUBSTITUTED POLYMERIZATION PRODUCT OF STYRENE AND MALEIC ACID
William Calloway Sheehan, Birmingham, Ala., assignor to E. I. du Pont de Nemours and Company, Wilmington, Del., a corporation of Delaware
No Drawing. Filed Apr. 25, 1960, Ser. No. 24,223
19 Claims. (Cl. 117—64)

This invention relates to the coating of continuous webs. More particularly, it relates to a process for uniformly coating continuous, flexible, transparent webs of hydrophilic organic polymeric materials such as regenerated cellulose film with an aqueous dispersion of the coating composition.

The coating of a continuous regenerated cellulose film is usually carried out by first passing the film through a dip tank containing the liquid coating composition, then through a doctoring device to regulate the amount of coating composiion retained on the surface of the film, then through a smoothing device to smooth and thus improve the appearance of the coating and, finally, through a drying zone, all steps being performed in a continuous manner. This process worked successfully for coating compositions which were dissolved in organic solvents.

However, the use of organic solvents is expensive. The solvent must be evaporated, then wasted to the atmosphere or recovered in special equipment. Water and the use of aqueous dispersions of the coating would seem to be a logical improvement.

The application of polymeric coatings, such as vinylidine chloride copolymer coatings, from aqueous dispersions of the copolymer, however, poses several new problems. The most important is a defectively coated film. The defects in the coating appear as striations, i.e., minute grooves or channels in the coating in a series of substantially parallel lines. It is believed that these striations result from a combination of the high solids content in the aqueous dispersion coating baths and the rapid imbibition of the water dispersant into the hydrophilic base film. The latter, particularly, tends to dehydrate the coating and, hence, tends to accelerate hardening before the smoothing operation can be completed effectively.

Expedients heretofore employed to smooth the coating before it sets or hardens are generally found to be inadequate and do not eliminate the aforementioned striations. Either they do not function effectively within the short period of time available between the point at which the coating is metered on the base film and the point at which the coating has become too hard; or the device used for smoothing may impose too much drag on the film causing other marks on the coating and, in many instances, causing the film to tear.

An object of the present invention is a process for the aqueous dispersion coating of continuous, flexible articles of hydrophilic organic polymeric material which overcomes the difficulties noted above. A further object is a continuous process for forming a uniform, smooth coating containing a coalescible vinylidene chloride copolymer on regenerated cellulose film using aqueous dispersion coating techniques. Other objects will appear hereinafter.

The objects are accomplished by applying to the hydrophilic organic polymeric article while it is in the form of a wet gel prior to initial drying thereof an aqueous alkaline medium containing a water-soluble salt of a substituted polymerization product of styrene and maleic anhydride containing about 50 mole percent of styrene in the polymer molecule, said polymerization product composed of "$xn$" units of

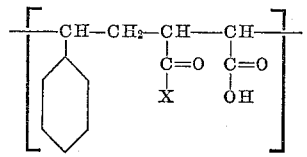

and "$n-xn$" units of

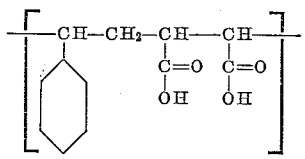

arranged randomly wherein

X is selected from the group consisting of —OR, —NHR,
R is an alkyl group of 5–18 carbon atoms,
$x$ has a value of 0.2–1,
$n$ is an integer sufficient to provide an inherent viscosity for the polymerization product of 0.1–1.0, said salt being formed with an alkaline agent selected from the group consisting of ammonia and amines having up to four carbon atoms; removing excess treating medium; and, thereafter, heating the polymeric article under controlled conditions of temperature and time to dry the article and insolubilize the substituted polymerization product; and then applying to the article a film-forming polymer from an aqueous dispersion thereof.

In the preferred embodiment, the present invention comprises treating a gel regenerated cellulose film with an aqueous solution containing at least 10% HY and 1%–10% of a water-soluble polymer composed of "$xn$" units of

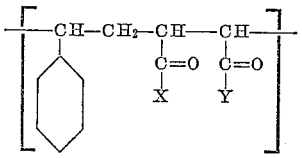

and "$n-xn$" units of

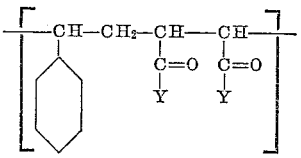

said units arranged randomly wherein

X is selected from the group consisting of —OR, —NHR,
Y is —$ONH_mR'_{(4-m)}$,
R is an alkyl group of 5–18 carbon atoms,
R' is an alkyl group of 1–4 carbon atoms,
$x$ has a value of 0.2–1,
$m$ is an integer having the value of 1–4,
$n$ is an integer sufficient to provide an inherent viscosity of 0.1–1.0, to impregnate said film with 0.1–3.75 grams/square meter of said water-soluble polymer; heating said treated film to a temperature of 85° C.–120° C. for a time between 0.5 and 5.0 minutes, said time being sufficient to convert said water-soluble polymer to 0.1–3.0 grams/square meter of an insoluble polymer composed of "xn" units of

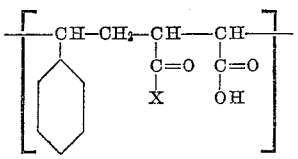

and "n—xn" units of

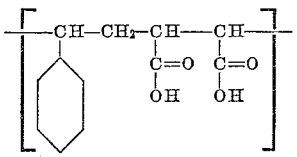

said units arranged randomly; thereafter, coating said treated film with an aqueous dispersion containing 5%–65% of a coalescible, organic, polymeric, film-forming material, preferably a copolymer of vinylidene chloride with at least one other mono-olefinc monomer copolymerizable with vinylidene chloride; removing excess dispersion from the regenerated cellulose film; smoothing said dispersion on the surface of the regenerated cellulose film and drying the coated film.

The process of this invention is described with specific reference to the coating of regenerated cellulose film with an aqueous dispersion of a vinylidene chloride copolymer. However, the invention is applicable to other shaped articles and other polymeric base materials. Thus, the invention is applicable to tubes, filaments, etc., as well as sheets, pellicles, webs and films. The articles may be composed of cellulosic materials such as regenerated cellulose prepared from solutions of cellulose xanthate or cuprammonium cellulose, or they may be of a cellulose ester or ether such as cellulose acetate, cellulose nitrate, ethyl cellulose, methyl cellulose, hydroxyethyl cellulose, hydroxypropyl cellulose, paper, etc., which materials contain free hydroxyl groups and are hydrophilic in character. Certain non-cellulosic materials such as polyvinyl alcohol and partially hydrolyzed ethylene-vinyl acetate copolymers also fit within this definition of hydrophilic organic polymeric materials and are operable in the present invention. The articles to be treated may be modified by the addition of plasticizers, softeners, dyes, pigments, sizes, fillers, etc.

The treated articles obtained in accordance with the process of the invention may be coated with any suitable film-forming agent or composition, particularly with such agent or composition in an aqueous dispersion. The process is well adapted for applying an aqueous dispersion of a vinylidene chloride copolymer to control the degree of moisture resistance and/or the gas permeability and/or the heat-sealability and/or any other similar property of the base material.

To achieve the results of the present invention, a hydrophilic polymeric article that can be effectively coated with an aqueous dispersion of a film-forming polymer, it is critical to impregnate the article with a material that will make the hydrophilic article substantially hydrophobic but will not affect the remaining properties of the article adversely. This is achieved in the present invention by impregnating with a polymer that is water-soluble so that it can enter the hydrophilic article rapidly but which is then easily converted to an insoluble form to prevent any substantial entry of additional moisture. The hydrophobic nature of the article impregnated with the substantially insoluble polymer is characterized by the article's low wettability and its low swelling in water. Specifically, it has been discovered that an impregnated dried film, i.e., a film containing the insoluble polymer, must exhibit a contact angle upon wetting with water of less than 75 degrees and an initial rate of thickness swelling of less than 4.5% per second in water.

Hence, prior to coating, the article may be described as a hydrophilic organic polymeric article, preferably a cellulosic article, containing 0.1–3.0 grams/square meter of an insoluble polymer composed of "xn" units of

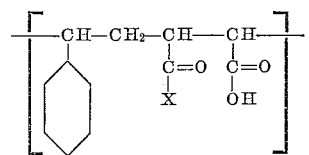

and "n—xn" units of

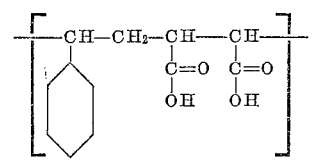

said units arranged randomly wherein

X is selected from the group consisting of —OR, —NHR,
x has a value of 0.2–1, and
n is an integer sufficient to provide an inherent viscosity of 0.1–1.0, characterized by a contact angle upon wetting with water of less than 75 degrees and an initial rate of thickness swelling of less than 4.5% per second in water.

The method employed to measure the average initial rate of thickness swelling involves first cutting 15 one-inch squares from the film to obtain a representative sample. One of the squares is then placed on a platform of an "Ames" gauge and its thickness is measured. Three or four drops of an aqueous solution of a wetting agent is placed on the surface of the film and the thickness measured at the end of various time intervals. The platform is dried after each series of determinations. The solution used is prepared by dissolving 3 grams of "Santomerse" 3[1] paste in one liter of distilled water. Measurements are made at room temperature. The average initial rate of swelling is computed from the initial thickness and the thickness after 5 seconds (called 5-second interval) or after 15 seconds (called 15-second interval). Results are expressed as average percent swelling per second.

The contact angle of wetting is the angle measured in the liquid water interface formed by a line drawn tangential to the point at which the three phases, film, liquid and air, make contact. A definition and explanation of contact angle can be found on page 482 of Samuel Glastone "Textbook of Physical Chemistry," D. Van Nostrand Co., Inc., New York, N.Y. (1946). It has been found that when the film exhibits a contact angle above 75 degrees, the wettability of the film by the subsequently applied aqueous coating dispersion is impaired; uniform wettability and consequent uniform application of the coating dispersion is not realized.

The polymers used in the form of their salts in the special treatment of the present invention are produced in accordance with methods well known to those skilled in the art. Thus, the N-alkyl styrene/maleamic acid polymers:

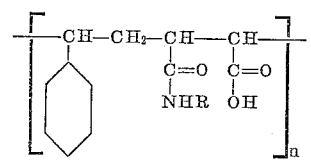

may be obtained by first polymerizing maleic anhydride and styrene in equimolar proportions followed by reaction with an amine. The maleic anhydride is dissolved or suspended in styrene and the mixture is heated in the presence of a catalyst such as dibenzoyl peroxide until the monomers are interpolymerized to form a polymeric ---
[1] Sodium dodecyl benzene sulfonate manufactured by Monsanto Chemical Co.

product containing 50 mole percent styrene. Suitable polymerization procedures are more fully described in U.S. Patent 2,205,882 to Graves and U.S. Patent 2,047,398 to Voss and Dickhauser. The product, the styrene/maleic anhydride polymer, is isolated and purified by precipitation with an acid from an alkaline solution. The polymer thus produced is dissolved in an organic solvent and the amine is added. The amine of the formula R—NH$_2$ wherein R is a C$_5$ to C$_{18}$ alkyl group may be added in a molar ratio of amine to styrene/maleic anhydride polymer of 0.2 to 1.0, the preferred range being from about 0.6 to just below 1.0. It will be noted that the precise minimum molar ratio of amine to styrene/maleic anhydride polymer to achieve the results of the present invention will depend on the length of the R group. Thus, for C$_{18}$, the minimum molar ratio is 0.2; for C$_{12}$, about 0.35; for C$_8$, about 0.6, etc. However, the maximum molar ratio in all cases, C$_5$ to C$_{18}$, is 1.0. Molar ratios above 1.0 tend to form polymeric salts that are insoluble in water and, therefore, do not impregnate the hydrophilic article sufficiently to achieve the results of the present invention. The formation of the N-alkyl styrene/maleamic acid is evidenced by the heat developed during the reaction. An elevated temperature is maintained for a period sufficient to insure complete reaction. The reaction mixture is then cooled to room temperature and added to an ice cold aqueous solution of an ammonium hydroxide or a C$_1$ to C$_4$ amine. The ammonium or amine salt of the N-alkyl styrene/maleamic polymer precipitates and is isolated by filtration.

The partial esters of styrene/maleic acid polymers:

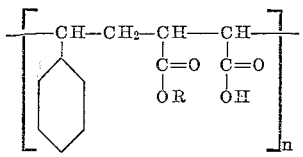

are also prepared according to conventional methods. First, maleic acid is reacted with an appropriate amount of the C$_5$ to C$_{18}$ alcohol. The molar ratio of alcohol to maleic acid is from 0.2 to 1.0, 0.6 to just below 1.0 being preferred, as discussed previously with regard to the styrene/maleamic acid polymer. It should be understood that a molar ratio of 1.0 will produce the half ester. After forming the partial or half ester of maleic acid, polymerization with styrene is the next step. Polymerization is accomplished by refluxing the ester with an equimolar proportion of styrene at an elevated temperature in the presence of water-insoluble catalysts such as benzoyl peroxide, lauroyl peroxide, diethyl, peroxide, acetyl peroxide, tertiary butyl peroxide, ditertiary butyl peroxide, ditertiary butyl perbenzoate, ditertiary amyl peroxide, diazoaminobenzene, α,α'-azobis isobutyronitrile, etc. The polymerization process is more fully described in U.S. Patent 2,798,062 to Contois. The resulting polymer is then cooled to room temperature and converted to the ammonium or amine salt in the manner described previously for the styrene/maleamic acid polymers.

It should be understood that styrene and maleic acid, although being the most readily available and cheapest of the materials for forming the polymers used herein, are not the only materials that can be used. Thus, any organic compound having at least 8 carbon atoms and containing one terminal ethylenic double bond as the sole aliphatic carbon-to-carbon unsaturation such as 1-octene, 1-dodecene, vinyl phenyl ketone, vinyl laurate will operate in place of styrene in this invention. Similarly, other butenedioic acids or acid anhydrides may be used.

Thus, acids having the following formula:

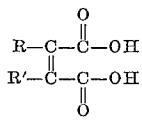

wherein R and R' are hydrogen atoms or alkyl, aryl, aralkyl or cycloaliphatic groups or anhydrides thereof are operable in the present invention.

In any event, the polymers used must have a relatively high molecular weight. The molecular weight should correspond to inherent viscosities of 0.1 to 1.0 in order to operate in the present invention. Those polymers with inherent viscosities of 0.2 to 0.7 are preferred. The determination of inherent viscosity is carried out with 0.5 gram of the polymer dissolved in 100 milliliters of acetone at 30° C. in accordance with the procedure described by L. H. Cragg in the Journal of Colloid Science, I, 261–269 (1946).

The ammonium or amine salt of the polymer may be used in a separate treating solution or, preferably, the salt may be incorporated in the aqueous softening bath such as the glycerol or ethylene glycol bath used in the conventional casting procedure for manufacturing regenerated cellulose film. In either case, the polymeric salt is impregnated into the regenerated cellulose film prior to the initial drying of the film while the film is in the form of a wet gel. Sufficient salt should be used to provide 0.1–3.0 grams of final polymer per square meter of dried film. At least 0.1 gram per square meter is necessary to provide smooth, even coating of aqueous dispersions containing a low amount of the coating resin. More than 3.0 grams per square meter tends to make the film surface more difficult to wet uniformly upon application of the aqueous coating dispersions. The salt should be soluble to the extent of at least 5% and can be used in concentrations of 1% to 5% in a 10% aqueous solution of ammonium hydroxide or amine. It may be used in the form of a bath in which the film or other article is dipped or the salt solution may be sprayed or brushed on the article. The method of treatment is not critical as long as it effects the required amount of impregnation.

After the excess has been removed and the film has been dried and the polymer has been converted to its insoluble form in the film by heating to a temperature of at least 85° C., the film is coated with the aqueous dispersion of the film-forming resin. It is obvious that the invention will be useful whenever an aqueous dispersion of an organic, coalescible, polymeric, film-former is being applied as a coating to a hydrophilic base and premature hardening of the film-former is a problem. Some useful coating compositions are disclosed in U.S. Patents 2,819,984, 2,805,963, 2,748,027, 2,744,080 and 2,570,478. The use of aqueous dispersions of vinylidene chloride copolymers as coating compositions are particularly useful because of the importance of such copolymers as .00003″–.0008″ thick coatings in imparting moisture resistance and heat-sealability to regenerated cellulose film. Such vinylidene chloride copolymers are obtained from at least 80% vinylidene chloride monomer, the remainder being at least one other mono-olefinic monomer copolymerizable with vinylidene chloride. While copolymers of vinylidene chloride with methyl acrylate are illustrated in the subsequent embodiments of the invention, other mono-olefinic monomers copolymerizable with vinylidene chloride may be used. The list includes: methyl, ethyl, isobutyl, octyl and 2-ethylhexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate, and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, methylene diethyl malonate, acrylamide, methacrylamide or monoalkyl substitution products thereof, phenyl vinyl ketone, diethyl fumarate, diethyl maleate, methylene diethyl malonate, dichlorovinylidene fluoride, dimethyl itaconate, diethyl itaconate, dibutyl itaconate, vinyl pyridine, maleic anhydride, allyl glycidyl ether and other unsaturated aliphatic ethers described in U.S. Patent 2,160,943. These compounds may be described as vinyl or vinylidene compounds having a single $CH_2=C<$ group, the most useful ones falling within the general formula

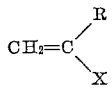

where R may be hydrogen, a halogen or a saturated aliphatic radical and X is selected from one of the following groups: —Cl, —Br, —F, —CN, —$C_6H_5$, —COOH,

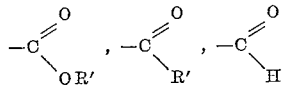

—$OC_6H_5$, —$CONH_2$, —CONH—R', and —CONR'$_2$, in which R' is alkyl. Unsaturated aliphatic acids such as itaconic acid, acrylic acid and methacrylic acid may be advantageously used in the preparation of the coating compositions.

The aqueous dispersion coatings may be applied in accordance with any known coating techniques. They may be applied by passing the film through baths in a continuous manner or in a batch manner. The coatings may also be sprayed onto the film or applied by brushing or the like. Ordinarily, the coatings are applied at room temperature. However, since the coatings are applied from aqueous dispersions, elevated temperatures provide no particular hardship. This is a distinct advantage over the use of organic solvents where elevated temperatures tend to evaporate substantial amounts of the solvent.

Advantages of the process stem from its simplicity—no substantial alteration of the conventional process is required; and its effect on the product—a uniformly coated base film that is moistureproof and heat-sealable yet flexible, transparent, and strong can be produced.

The coated regenerated cellulose films produced by employing the present invention are useful wherever regenerated cellulose films have heretofore been used. They serve advantageously as moistureproof packaging materials for foods, cigarettes and the like. They are particularly useful where the packages must be shipped great distances. Furthermore, these films are outstanding as a vacuum and pressure packaging material in the packaging of luncheon meats, cheese, nuts, etc.

The invention will be more clearly understood by referring to the examples which follow, Example 1 representing the best mode contemplated for carrying out the invention. A convenient summary of the examples and controls is presented in the table, Table II, following the examples.

EXAMPLE 1

A viscose solution was extruded through a slotted hopper into a solution of sulfuric acid and sodium sulfate to form a gel regenerated cellulose film in the conventional manner. After being washed, desulfured and bleached, the gel film which was 0.003 inch thick was passed prior to drying through an aqueous bath containing 7% ethylene glycol as a softener, 10% ammonium hydroxide and 5% of an ammonium salt of the amyl half ester of styrene/maleic anhydride copolymer. The preparation of the ammonium salt is described below. Excess solution was removed from the film by passing the film through squeeze rolls. The continuous film was then dried by passing through heated rolls of a conventional drier where it was exposed to a temperature of 100° C. for a period of 5 minutes. The dried film, 0.001 inch thick, contained 1.5 gram/square meter of the amyl half ester of maleic acid/styrene polymer, displayed an initial rate of swelling of 2% per second and a contact angle of 60 degrees.

The polymer had been prepared in the following manner. First, the amyl half ester of maleic acid was prepared by reacting 100 grams of maleic anhydride with 88 grams of amyl alcohol at a temperature of 80° C.–85° C. with constant agitation for a period of 2½ hours. The resulting amyl half ester of maleic acid was placed in a reaction vessel fitted with a reflux condenser and a stirrer and there was then added a solution of 0.4 gram of beta-nitrostyrene, 5 grams of n-dodecylmercaptan and 1 gram of ditertiary butyl peroxide in 100 grams of styrene. The reaction mixture was heated rapidly with stirring to 120° C. whereupon a rapid rise in temperature occurred. Heating of the reaction mixture was discontinued at this point while the exothermic reaction continued until the temperature reached 200° C. The reaction mixture containing the amyl half ester of styrene/maleic acid copolymer was cooled and then removed from the reaction vessel. The inherent viscosity of a solution of 0.5 gram of the copolymer in 100 ml. of acetone at 30° C. was 0.45. Thereafter, the ammonium salt was formed by dissolving the product to a concentration of 5% in a 10% ammonium hydroxide solution.

After drying, the film impregnated with the amyl half ester of styrene/maleic acid polymer was coated with an aqueous dispersion of a copolymer of vinylidene chloride, methyl acrylate and itaconic acid. The coating composition was prepared from the following ingredients:

| | Parts |
|---|---|
| Water | 400 |
| Vinylidene chloride | 380 |
| Methyl acrylate | 20 |
| Itaconic acid | 8 |
| "Duponol" ME (sodium lauryl sulfate) | 8 |
| "Darvan" #1 (condensation product of sodium beta naphthalene sulfonate and formaldehyde) | 4 |
| Ammonium persulfate | 2 |
| Meta-sodium bisulfite | 1 |

The water, ammonium persulfate and "Duponol" ME were placed in a round-bottom vessel. The vessel, fitted with a reflux condenser and a stirrer, was immersed in a water bath maintained at 33° C.–34° C. After stirring until solution was complete, the premixed monomers (vinylidene chloride, methyl acrylate and itaconic acid) were added followed by the addition of the meta-sodium bisulfite. Polymerization was accomplished by refluxing at the prevailing temperature, 33° C.–34° C. After 1½ hours, refluxing ceased indicating the polymerization was substantially complete. Stirring was continued for another 30 minutes to assure complete polymerization. "Darvan" #1 was then added to the dispersion.

The dispersion was coated on both sides of the regenerated cellulose film by passing the film through a dip tank containing the dispersion. The coated film was then passed through doctor rolls to remove excess bath and to meter the desired quantity of the dispersion onto the film. Immediately after leaving the doctor rolls, the wet coated film was conducted vertically through a bank of smoothing rolls consisting of twelve 2″ diameter polished rolls placed tangentially to the film and alternately located six on each side of the film as shown in application Serial No. 764,889, filed October 2, 1958, to J. W. Meier, now U.S. Patent No. 2,977,243, and assigned to the assignee of the present application. The rolls were rotated with a peripheral speed equal to 75% of the film speed in a direction opposite to that of the moving film. The film was then passed through a vertical drier to remove excess moisture and was then wound as a roll. Six grams per square meter of the vinylidene chloride copolymer was applied to the film in this manner at a speed of 150 yards per minute. The coated film was highly transparent and free of coating striations.

As one control, A, the sheet of gel regenerated cellulose was passed prior to drying through an aqueous bath containing 7% of ethylene glycol only, the ammonium salt of the amyl half ester of the styrene/maleic acid copolymer was omitted. The dried film was found to have a rate of swelling of 11% per second and a contact angle of 45 degrees. When the identical aqueous coating dispersion as in the example was applied, the resulting coated film was characterized by an excessive number of coating striations.

As a second control, B, the gel regenerated cellulose film was passed prior to drying through an aqueous bath containing 7% ethylene glycol and 5% of an ammonium salt of a styrene/maleic acid copolymer instead of the ammonium salt of the amyl half ester of the styrene/maleic acid polymer. The dried film had a rate of swelling of 10.3% per second and a contact angle of wetting of 48 degrees. Upon dispersion coating of this film following the procedure described in the example, a coated film showing extremely heavy coating striations was obtained.

EXAMPLE 2

The copolymer used in this example was prepared in the manner described for Example 1 except that the catalysts, beta-nitrostyrene and n-dodecylmercaptan, were omitted. After cooling, the amyl half ester of styrene/maleic acid copolymer was isolated from the reaction mixture and its inherent viscosity was measured. The inherent viscosity was 0.7 indicating a higher molecular weight than the copolymer of Example 1.

A sheet of gel regenerated cellulose film was treated with a 10% ammonium hydroxide solution containing 3% of the styrene/maleic acid copolymer and 7% of ethylene glycol. After drying, the sheet was found to contain 1.2 gram per square meter of the copolymer. When tested, it displayed an initial rate of thickness swelling of 1.2% per second and a contact angle of 62 degrees.

EXAMPLE 3

This example illustrates the results of using a copolymer obtained from amyl alcohol, styrene and maleic anhydride in which the molar ratio of alcohol to styrene or maleic anhydride is 0.8.

First the amyl ester of maleic acid was prepared by heating 100 grams of maleic anhydride and 70 grams of amyl alcohol to a temperature of 80° C.–85° C. in a reactor vessel while constantly agitating the ingredients for a period of two hours. To the resulting ester, 0.4 gram of beta-nitrostyrene, about 5 grams of n-dodecylmercaptan and 1 gram of ditertiary butyl peroxide in 100 grams of styrene were added. The polymerization reaction was carried out as described in Example 1 and the product was isolated. The inherent viscosity of the copolymer was found to be 0.55.

A 5% solution of the copolymer in a 10% ammonium hydroxide solution which also contained 7% ethylene glycol was used for treating a gel regenerated cellulose film. After excess solution was removed and the film dried at a temperature of 90° C., the film was tested and showed an initial rate of thickness swelling of 3.9% and a contact angle of wetting of 55 degrees.

EXAMPLE 4

This example illustrates the results of using a copolymer obtained from amyl alcohol, styrene and maleic anhydride in which the molar ratio of alcohol to styrene or maleic anhydride is 0.3.

The amyl ester of maleic acid was prepared by heating with agitation 27 grams of amyl alcohol and 100 grams of maleic acid at a temperature of 80° C.–85° C. for a period of 2½ hours. A solution of 0.4 gram of beta-nitrostyrene, 5 grams of n-dodecylmercaptan and 1 gram of ditertiary butyl peroxide in 100 grams of styrene was added to the partial ester. The resulting mixture was heated with stirring for 20 minutes to cause a vigorous exothermic reaction in which the temperature rose to 190° C. After the reaction had subsided, the mixture was cooled and the resulting partial amyl ester of styrene/maleic acid copolymer was isolated. Its inherent viscosity was 0.4.

A gel regenerated cellulose film was passed through a solution containing 5% of the copolymer, 10% ammonium hydroxide and 7% ethylene glycol. After drying the film at a temperature of 95° C. for 4 minutes, the dried film containing 2.8 grams/square meter of the insolubilized polymer was tested. The film displayed an initial rate of thickness swelling of 4.2% per second and a contact angle of 55 degrees.

EXAMPLE 5

A lauryl half ester of maleic acid was prepared by heating 186 grams of lauryl alcohol (dodecanol-1) and 100 grams of maleic anhydride at a temperature of 83° C.–85° C. while stirring for 3 hours. After cooling the mixture to 25° C., a solution of 0.4 gram of beta-nitrostyrene, 5 grams of n-dodecylmercaptan and 1 gram of ditertiary butyl peroxide in 100 grams of styrene was added. This mixture was heated for 20 minutes at a temperature of 120° C. whereupon the reaction became exothermic causing the temperature to rise rapidly to 200° C. After reaction had subsided, the mass was cooled to room temperature, removed from the reaction flask and the lauryl half ester of styrene/maleic acid copolymer was isolated. The copolymer had an inherent viscosity of 0.4.

A gel regenerated cellulose film was immersed in a solution containing 3% of the copolymer, 10% ammonium hydroxide and 7% ethylene glycol. Excess solution was removed and the film was dried at a temperature of 115° C. The film containing 1.0 gram of the insolubilized copolymer per square meter of film and 14% by weight of ethylene glycol showed a rate of swelling of 0.8% per second and a contact angle of 70 degrees.

EXAMPLE 6

The preparation of a stearyl half ester of a styrene/maleic acid copolymer was carried out as described for Example 5 except that 255 grams of stearyl alcohol (octadecanol-1) was used instead of lauryl alcohol. The resulting copolymer had an inherent viscosity of 0.3. A gel regenerated cellulose film was immersed in a solution containing 1% of the copolymer, 10% ammonium hydroxide and 7% ethylene glycol. After excess solution was removed, the film was dried at a temperature of 110° C. The dried film containing 0.4 gram per square meter of the insolubilized copolymer and 15.5% of ethylene glycol displayed an initial rate of thickness swelling of 0.7% per second and a contact angle of 73 degrees.

EXAMPLE 7

The octyl(2-ethylhexyl) half ester of a styrene/maleic acid copolymer was prepared in a manner identical to that described for Example 6 except that 130 grams of 2-ethylhexanol was used in place of the stearyl alcohol. The resulting polymer had an inherent viscosity of 0.35. A gel regenerated cellulose film was immersed in a solution containing 5% of the copolymer, 10% ammonium hydroxide and 7% ethylene glycol. Excess solution was removed and the film was dried at a temperature of 105° C. The dried film containing 1.5 grams of the insolubilized copolymer per square meter of film and 14.5% ethylene glycol displayed an initial rate of thickness swelling of 0.9% per second and a contact angle of 68 degrees.

In a control, A, a gel regenerated cellulose film was treated with a solution that did not contain the copolymer. It displayed an initial rate of thickness swelling of 9.3% per second and a contact angle of 42 degrees.

EXAMPLES 8–13

A styrene/maleic anhydride copolymer was prepared by solution polymerization in the following manner. A solution of 50 grams of maleic anhydride, 52 grams of styrene and 1 gram of benzoyl peroxide was heated at 85° C.–90° C. in an autoclave under nitrogen for 14 hours. The product was isolated by pouring the reaction mixture into water; and was purified by repeated precipitation with dilute sulfuric acid from a dilute sodium hydroxide solution.

The N-n-dodecyl styrene/maleamic acid copolymer was then prepared. A solution containing 35 grams of n-dodecyl amine in 70 milliliters of dimethylformamide was added dropwise with vigorous stirring to a solution of 100 grams of the styrene/maleic anhydride copolymer in 800 milliliters of methyl ethyl ketone and dimethylformamide, the volume ratio of methyl ethyl ketone to dimethylformamide being 5. The molar ratio of n-dodecyl amine to the styrene/maleic anhydride copolymer in Example 8 was 0.45. The heat from the resulting reaction raised the temperature of the reacting mixture to 50° C.–60° C. This temperature was maintained for a period of 5 hours. The reaction mixture was then cooled to room temperature and the N-n-dodecylstyrene/maleamic acid copolymer was precipitated by adding the reaction mixture to an ice cold aqueous solution of ammonium hydroxide. After isolating the copolymer by filtration, a solution of the copolymer containing 3% copolymer, 10% ethylene glycol and 10% ammonium hydroxide was prepared. The copolymer had an inherent viscosity of 0.69.

A gel regenerated cellulose film was passed through the ammoniacal solution of the copolymer. Excess solution was removed and the film was dried at a temperature of 85° C. The resulting film containing 0.8 gram per square meter of the insolubilized polymer and 23% ethylene glycol was tested. It displayed an initial rate of thickness swelling of 2.9% per second and a contact angle of wetting of 70 degrees.

In Examples 9–13, copolymers were prepared in the manner described for Example 8 in which varying ratios of n-dodecylamine to the styrene/maleic anhydride copolymer were used. The resulting copolymers all had inherent viscosities of about 0.7.

The salts of the N-n-dodecylstyrene/maleamic acid copolymers were made by dissolving the copolymer to the extent of 3% in a solution also containing 10% ethylene glycol and 10% ammonium hydroxide as in Example 8. A gel regenerated cellulose film was impregnated with the solution and the impregnated film was dried at 90° C. The dried films, all containing 9%–10% ethylene glycol and varying amounts of the insolubilized copolymer, were tested for their initial rates of thickness swelling and their contact angle of wetting.

A summary of the results of Examples 9–13 as well as Example 8 is provided in the table, Table I, below along with results for two controls. In control A, a ratio of amine-to-styrene/maleic anhydride copolymer of 1.3 was used in forming the copolymer. However, such a copolymer was not soluble in the ammoniacal solution. In control B, the ratio was zero, i.e., no amine was used with the styrene/maleic anhydride copolymer. The rate of thickness swelling of the impregnated film was far above the upper limit necessary for producing a smooth, uniform coated regenerated cellulose film without striations.

Table I

| Ex. | Mole Ratio Amine-to-S$^a$/MA$^b$ Copolymer | Weight of Copolymer In Film, grams/ meter$^2$ | Rate of Thickness Swelling, percent/ sec. | Contact Angle of Wetting (degrees) |
|---|---|---|---|---|
| 8 | 0.45 | 0.8 | 2.9 | 70 |
| 9 | 0.3 | 0.8 | 2.9 | 70 |
| 10 | 0.6 | 0.8 | 0.9 | 73 |
| 11 | 0.53 | 1.5 | 1.7 | 70 |
| 12 | 0.45 | 1.6 | 2.3 | 65 |
| 13 | 0.35 | 1.5 | 4.3 | 60 |
| A | 1.3 | (c) | (c) | (c) |
| B | 0 | 3.0 | 10.4 | 45 |

$^a$ S is styrene.
$^b$ MA is maleic anhydride.
$^c$ Insoluble in 10% NH$_4$OH.

EXAMPLE 14

This example was carried out exactly as described for Example 8 except that n-hexylamine was used instead of n-dodecylamine in a mole ratio of amine to the styrene/maleic anhydride copolymer of 0.8. The resulting copolymer had an inherent viscosity of about 0.7. A gel regenerated cellulose film containing 1.5 grams per square meter of the N-n-hexylstyrene/maleamic acid copolymer and 15% ethylene glycol was prepared in the manner described for Example 8. The film displayed an initial rate of thickness swelling of 4.4% and a contact angle of wetting of 50 degrees.

EXAMPLE 15

This example was carried out exactly as described for Example 8 except that cyclohexylamine was used instead of n-dodecylamine in a mole ratio of amine to the styrene/maleic anhydride copolymer of 0.8. The resulting copolymer had an inherent viscosity of about 0.7. A gel regenerated cellulose film containing 1.2 grams per square meter of the N-cyclohexylstyrene/maleamic acid copolymer and 13% ethylene glycol was prepared in the manner described for Example 8. The film displayed an initial rate of thickness swelling of 4.3% and a contact angle of wetting of 50 degrees.

EXAMPLE 16

This example was carried out exactly as described for Example 8 except that n-octylamine was used instead of n-dodecylamine in a mole ratio of amine to the styrene/maleic anhydride copolymer of 0.6. The resulting copolymer had an inherent viscosity of about 0.7. A gel regenerated cellulose film containing 1.4 grams per square meter of the N-n-octylstyrene/maleamic acid copolymer and 13% ethylene glycol was prepared in the manner described for Example 8. The film displayed an initial rate of thickness swelling of 4.3% and a contact angle of wetting of 60 degrees.

EXAMPLE 17

This example was carried out in a manner similar to that described for Example 8 except that n-octadecylamine was used instead of n-dodecylamine. The mole ratio of the amine to the styrene/maleic anhydride copolymer was 0.25 and the inherent viscosity of the styrene/maleic anhydride copolymer was 0.6. The ammonium salt, N-n-octadecylstyrene/maleamic acid copolymer, was formed by dissolving the copolymer in a 5% aqueous ammonium hydroxide solution which also contained 7% ethylene glycol. A gel regenerated cellulose film was impregnated with this salt by passing the film through the solution. Excess solution was removed and the film was heated to a temperature of 110° C. to dry the film and to insolubilize the copolymer. The resulting dried film containing 0.5 gram per square meter of the copolymer showed a rate of thickness swelling of 4.0% and a contact angle of wetting of 65 degrees.

Table II
SUMMARY OF EXAMPLES

| Example | Copolymer Used | Mole[a] Ratio | Inherent Viscosity | Rate of Thickness Swelling (percent/second) | Contact Angle of Wetting (degrees) |
|---|---|---|---|---|---|
| 1 | amyl ester of S/MAc | 1.0 | 0.45 | 2 | 60 |
| 1A[b] | none | none | none | 11 | 45 |
| 1B[b] | S/MAc | 0 | 0.45 | 10.3 | 48 |
| 2 | amyl ester of S/MAc | 1.0 | 0.7 | 1.2 | 62 |
| 3 | do | 0.8 | 0.55 | 3.9 | 55 |
| 4 | do | 0.3 | 0.4 | 4.2 | 55 |
| 5 | lauryl ester of S/MAc | 1.0 | 0.4 | 0.8 | 70 |
| 6 | stearyl ester of S/MAc | 1.0 | 0.3 | 0.7 | 73 |
| 7 | (2-ethylhexyl) ester of S/MAc | 1.0 | 0.35 | 0.9 | 68 |
| 7A[b] | none | none | none | 9.3 | 42 |
| 8 | N-n-dodecyl S/MaAc | 0.45 | 0.69 | 2.9 | 70 |
| 8–13A[b] | do | 1.3 | 0.7 | (c) | (c) |
| 8–13B[b] | S/MAc | 0 | 0.7 | 10.4 | 45 |
| 9 | N-n-dodecyl S/MaAc | 0.3 | 0.7 | 2.9 | 70 |
| 10 | do | 0.6 | 0.7 | 0.9 | 73 |
| 11 | do | 0.53 | 0.7 | 1.7 | 70 |
| 12 | do | 0.45 | 0.7 | 2.3 | 65 |
| 13 | do | 0.35 | 0.7 | 4.3 | 60 |
| 14 | N-n-hexyl S/MaAc | 0.8 | 0.7 | 4.4 | 50 |
| 15 | N-cyclohexyl S/MaAc | 0.8 | 0.7 | 4.3 | 50 |
| 16 | N-n-octyl S/MaAc | 0.6 | 0.7 | 4.3 | 60 |
| 17 | N-n-octadecyl S/MaAc | .25 | 0.6 | 4.0 | 65 |

[a] Mole ratio of alcohol or amine-to-styrene in copolymer.
[b] Outside scope of the invention.
[c] Insoluble.
S is styrene. MAc is maleic acid. MaAc is maleamic acid.

Having fully disclosed the invention, what is claimed is:

1. In a process for improving the properties of regenerated cellulose film wherein the regenerated cellulose film is cast, purified, softened, dried and coated with a coalescible film-forming material from an aqueous dispersion of said material and the coating is then smoothed and dried, the improvement which comprises applying to said film in the form of a wet gel after purification but prior to the first drying step an aqueous alkaline medium containing a water-soluble salt of a substituted polymerization product of styrene and maleic acid containing about 50 mole percent of styrene in the polymer molecule, said polymerization product composed of "$xn$" units of

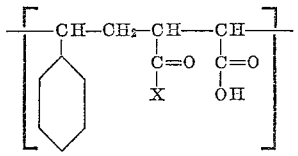

and "$n-xn$" units of

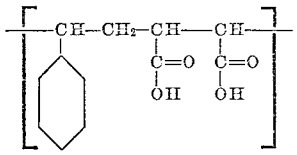

arranged randomly wherein

X is selected from the group consisting of —OR, —NHR,
R is an alkyl group of 5–18 carbon atoms,
$x$ has a value of 0.2–1,
$n$ is an integer sufficient to provide an inherent viscosity for the polymerization product of 0.1–1.0, said salt being formed with an alkaline agent selected from the group consisting of ammonia and amines having up to 4 carbon atoms; removing excess of said medium; and, thereafter, heating said film under controlled conditions of temperature and time to dry the film and insolubilize the substituted polymerization product to provide 0.1–3.0 grams of said polymerization product per square meter of said dried film; and then applying to said film a coalescible film-forming material from an aqueous dispersion thereof.

2. A process as in claim 1 wherein the substituted polymerization product is a partial amyl ester of a styrene/maleic acid copolymer.

3. A process as in claim 1 wherein the substituted polymerization product is a partial lauryl ester of a styrene/maleic acid copolymer.

4. A process as in claim 1 wherein the substituted polymerization product is a partial stearyl ester of a styrene/maleic acid copolymer.

5. A process as in claim 1 wherein the substituted polymerization product is a partial 2-ethylhexyl ester of a styrene/maleic acid copolymer.

6. A process as in claim 1 wherein the substituted polymerization product is a polymer composed of "$xn$" units of N-n-dodecylstyrene/maleamic acid.

7. A process as in claim 1 wherein the substituted polymerization product is a polymer composed on "$xn$" units of N-n-hexylstyrene/maleamic acid.

8. A process as in claim 1 wherein the substituted polymerization product is a polymer composed of "$xn$" units of N-n-octylstyrene/maleamic acid.

9. A process as in claim 1 wherein the substituted polymerization product is a polymer composed of "$xn$" units of N-cyclohexylstyrene/maleamic acid.

10. A process as in claim 1 wherein the substituted polymerization product is a polymer composed of "$xn$" units of N-n-octadecylstyrene/maleamic acid.

11. A process as in claim 1 wherein said film is heated to a temperature of 85° C.–120° C. for 0.5–5.0 minutes after said aqueous alkaline medium containing the water-soluble salt of the substituted polymerization product has been applied.

12. A process as in claim 1 wherein said coalescible film-forming material is a copolymer of vinylidene chloride with at least one other mono-olefinic monomer copolymerizable with vinylidene chloride.

13. A process as in claim 12 wherein said aqueous dispersion contains 5%–65% of said vinylidene chloride copolymer.

14. A hydrophilic organic polymeric article coated with 0.1–3.0 grams/square meter of an insoluble polymer composed of "$xn$" units of

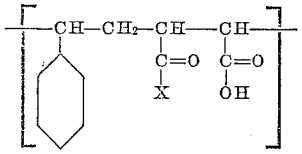

and "n—xn" units of

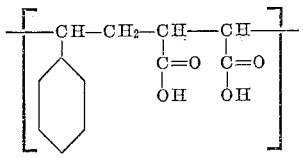

arranged randomly wherein

X is selected from the group consisting of —OR, —NHR,
R is an alkyl group of 5–18 carbon atoms,
$x$ has a value of 0.2–1 and
$n$ is an integer sufficient to provide an inherent viscosity of 0.1–1.0, said article having a contact angle upon wetting with water of less than 75 degrees and an initial rate of thickness swelling of less than 4.5% per second in water.

15. A regenerated cellulose article coated with 0.1–3.0 grams/square meter of an insoluble polymer composed of "xn" units of

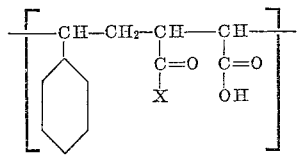

and "n—xn" units of

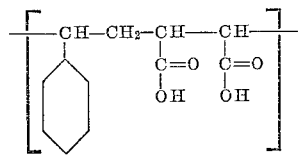

arranged randomly wherein

X is selected from the group consisting of —OR, —NHR,
R is an alkyl group of 5–18 carbon atoms,
$x$ has a value of 0.2–1 and
$n$ is an integer sufficient to provide an inherent viscosity of 0.1–1.0, said article having a contact angle upon wetting with water of less than 75 degrees and an initial rate of thickness swelling of less than 4.5% per second in water.

16. A regenerated cellulose film coated with 0.1–3.0 grams/square meter of an insoluble polymer composed of "xn" units of

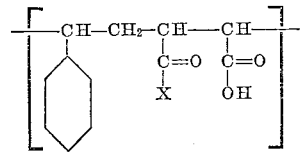

and "n—xn" units of

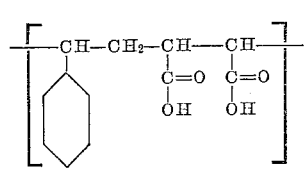

arranged randomly wherein

X is selected from the group consisting of —OR, —NHR,
R is an alkyl group of 5–18 carbon atoms,
$x$ has a value of 0.2–1 and
$n$ is an integer sufficient to provide an inherent viscosity of 0.1–1.0, said film having a contact angle upon wetting with water of less than 75 degrees and an initial rate of thickness swelling of less than 4.5% per second in water.

17. A regenerated cellulose film coated with 0.1–3.0 grams/square meter of an insoluble polymer composed of "xn" units of

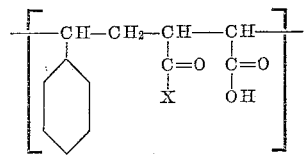

and "n—xn" units of

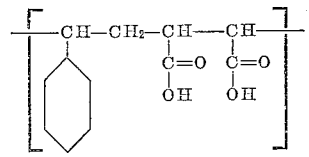

arranged randomly wherein

X is selected from the group consisting of —OR, —NHR,
R is an alkyl group of 5–18 carbon atoms,
$x$ has a value of 0.2–1 and
$n$ is an integer sufficient to provide an inherent viscosity of 0.1–1.0, coated with a copolymer of vinylidene chloride wtih at least one other mono-olefinic monomer copolymerizable with vinylidene chloride.

18. In a process for improving the properties of a hydrophilic organic polymeric article wherein the article is purified, dried and coated with a coalescible film-forming material from an aqueous dispersion of said material and the coating is then smoothed and dried, the improvement which comprises applying to said article in the wet gel state after purification but prior to the first drying step an aqueous alkaline medium containing a water-soluble salt of a substituted polymerization product of styrene and maleic acid containing about 50 mole percent of styrene in the polymer molecule, said polymerization product composed of "xn" units of

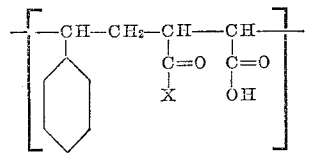

and "n—xn" units of

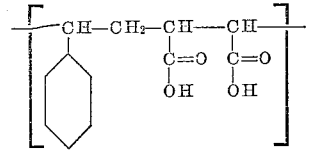

arranged randomly wherein

X is selected from the group consisting of —OR, —NHR,
R is an alkyl group of 5–18 carbon atoms,
$x$ has a value of 0.2–1,
$n$ is an integer sufficient to provide an inherent viscosity for the polymerization product of 0.1–1.0, said salt being formed with an alkaline agent selected from the group consisting of ammonia and amines having up to 4 carbon atoms; removing excess of said medium; and, thereafter, heating said article under controlled conditions of temperature and time to dry the article and insolubilize the substituted polymerization product to provide 0.1–3.0 grams of said polymerization product per square meter of said dried article; and then applying to said article a coalescible film-forming material from an aqueous dispersion thereof.

19. A process which comprises applying to a gel regenerated cellulose film an aqueous solution containing at least 10% HY and 1%–10% of a water-soluble polymer composed of "xn" units of

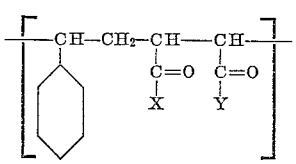

and "n−xn" units of

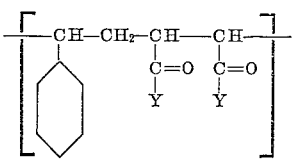

said units arranged randomly wherein

X is selected from the group consisting of —OR, —NHR,
Y is —ONH$_m$R'$_{(4-m)}$,
R is an alkyl group of 5–18 carbon atoms,
R' is an alkyl group of 1–4 carbon atoms,
$x$ has a value of 0.2–1,
$m$ is an integer having the value of 1–4,
$n$ is an integer sufficient to provide an inherent viscosity of 0.1–1.0, to impregnate said film with 0.1–3.75 grams/square meter of said water-soluble polymer; heating said treated film to a temperature of 85° C.–120° C. for a time between 0.5 and 5.0 minutes sufficient to convert said water-soluble polymer to 0.1–3.0 grams/square meter of an insoluble polymer composed of "xn" units of

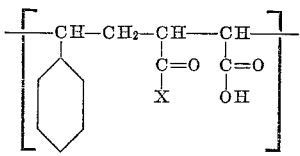

and "n−xn" units of

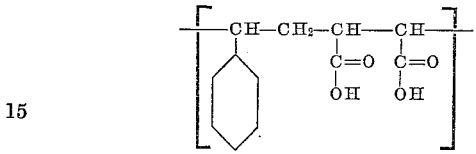

arranged randomly; thereafter, coating said treated film with an aqueous dispersion containing 5%–65% of a coalescible, organic, polymeric, film-forming material; removing excess dispersion from the regenerated cellulose film; smoothing said dispersion on the surface of the regenerated cellulose film and drying the coated film.

References Cited in the file of this patent

UNITED STATES PATENTS

| | | |
|---|---|---|
| 2,469,407 | Powers et al. | May 10, 1949 |
| 2,597,625 | Drisch et al. | May 10, 1952 |
| 2,650,172 | Brillhart | Aug. 25, 1953 |
| 2,691,609 | Snyder | Oct. 12, 1954 |
| 2,697,672 | Rossin | Dec. 21, 1954 |
| 2,909,449 | Banigan | Oct. 20, 1959 |
| 2,996,405 | Van Campen | Aug. 15, 1961 |

FOREIGN PATENTS

| | | |
|---|---|---|
| 554,877 | Canada | Mar. 25, 1958 |